Nov. 1, 1960 W. A. McINTOSH 2,958,658
FOAM PRODUCING COMPOSITION
Filed April 1, 1955
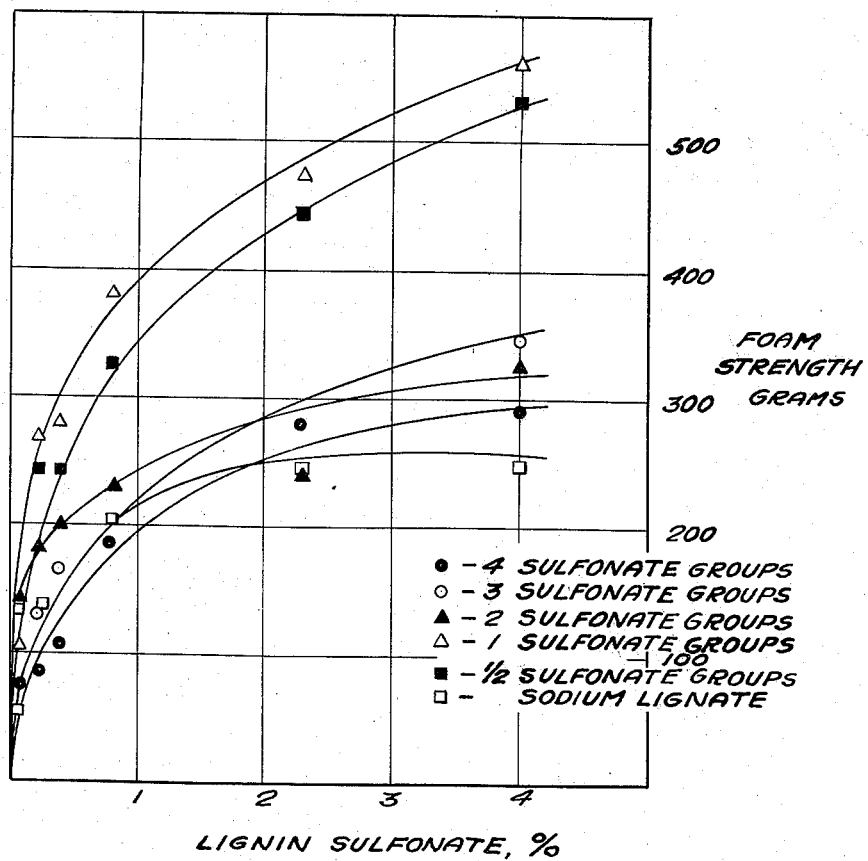
INVENTOR.
William A. McIntosh
BY
ATTORNEYS

United States Patent Office 2,958,658
Patented Nov. 1, 1960

2,958,658
FOAM PRODUCING COMPOSITION

William A. McIntosh, Summerville, S.C., assignor to West Virginia Pulp and Paper Company, New York, N.Y., a corporation of Delaware Filed Apr. 1, 1955, Ser. No. 498,495
2 Claims. (Cl. 252—3)

My present invention relates to improvements in foam-producing compositions useful for fire fighting purposes. In such use, a gas, usually $CO_2$ is liberated which passes through a liquid medium causing the formation of bubbles, i.e. foam. These bubbles persist for varying lengths of time, depending upon the amount and kind of stabilizer used. Among foams that are available for the purpose, those that are the stronger are usually preferred and reference to measurement of foam strength is made hereinafter. As foam producers or stabilizers, ligneous compounds have been proposed from time to time. For example, the lignin containing black liquor which is the waste liquor produced when making pulp by the sulfate method, has been proposed in Walker patent 1,219,509. At least two drawbacks attend the use of black liquor; first, the black liquor upon acidification, as is necessary to generate $CO_2$, may also produce hydrogen sulfide from reduced sulfur compounds present; and, second, it is difficult to maintain a black liquor concentrate in a bicarbonate solution up to strength since upon standing some of the lignin of black liquor solids will precipitate out and therefore will not partake in the reaction. The use of the sodium salt of lignin has also been propored but it also suffers from the drawback that upon standing, it undergoes loss of strength by a portion of the lignin salt separating out.

I have now discovered that a partially sulfonated lignin is free of the above mentioned drawbacks while producing a considerably stronger foam than the unsulfonated variety. More specifically, I have discovered that lignin containing from ½ to 4 sulfonic groups per molecule of lignin of assumed weight of 840 give superior results.

The single figure comprising the drawing shows graphically the results obtained using lignins containing varying numbers of sulfonic groups. The partially sulfonated lignins may be prepared by cooking a mixture of sodium sulfite and a water slurry of lignin under pressure with agitation at temperatures between 212° F. and 340° F., depending upon the proportion of sodium sulfite to lignin and the time and temperature conditions the amount of sulfonation may be controlled. Such partially sulfonated lignins are now sold by West Virginia Pulp and Paper Company, 230 Park Avenue, New York 17, New York, under the trade name Polyfon; that designated H has ½ sulfonic group; that designated O has 1; that designated T has 2; that designated R has 3; and that designated F has 4 sulfonic groups.

*Example*

5 grams of lignin sulfonate containing 1 sulfonic group in the form of the sodium salt was dissolved in 100 ml. water, after which 3.5 grams of solium bicarbonate was added. This solution was put in a 1000 ml. graduate. A solution of 4.68 gr. of alum $(Al_2(SO_4)_3 18H_2O)$ in 20 ml. water was added to the graduate and the resulting foam allowed to rise for 1 minute. At the end of this time, the volume was read directly and found to be 680 ml. The strength of the foam was then measured in the following device and found to be 560 grams: A standard one-litre graduate was chosen having a height of 17⅜ inches and an internal diameter of 2⅜ inches from the inside bottom to the 1000 ml. mark was 14⅛ inches. A plunger was then contrived so as to loosely fit the inside of the graduate. In the form as employed by me, the plunger consisted of an aluminum rod ⅛ inch in diameter and terminating at its lower end in a 2¼ inches diameter disk normal thereto. The disk was provided with four ⅛ inch holes equally spaced on a 1¾ inches diameter circle. The rod passed through a snug-fitting tin cover having a ¾ inch hole in the center. At its upper end the rod was provided with a platform consisting of a horizontally disposed disk of 16-gage aluminum of suitable diameter. In use after the foam had risen for one minute and the foam volume read, the plunger was placed in the graduate, the cover put in place over the top of the graduate and the plunger gently lowered until the lower disk rested on the top of the foam. Then the platform was weighted until the plunger started to sink through the foam, and the amount of the weight to the nearest 5 grams, recorded as the foam strength.

Having arrived at the foam producing composition, the same may be employed in any standard way as for example the following: For a 2½ gallon extinguisher of a standard type, having an inner and an outer chamber, 1.5–2 pounds of alum is dissolved in 2–2.5 pints of water and put into the inner chamber of the extinguisher. In the outer chamber is put 1.25 to 1.75 pounds sodium bicarbonate, dissolved in 1.5–2 gallons of water, in which from 5–15 ounces of the improved foaming composition or stabilizer is added and dissolved therein. In use, the extinguisher is inverted to cause the two solutions to come together, and thus produce the required foam composed of bubbles carbon dioxide.

The foregoing example was one of a series using different quantities of lignin sulfonates and lignin compounds containing different numbers of sulfonic groups up to four, including a ½ group—i.e. one sulfonic group per two molecules of lignin. The data so obtained were plotted as per the graph of the figure. For the sake of comparison, data with respect to sodium lignate are also given.

In contrast to sulfite waste liquor products, licorice and other commonly used stabilizers, my improved foaming composition will not support the growth of moulds, which when present, weaken the foam produced and give rise to undesirable odors.

I claim:

1. A foam producing composition useful for fire extinguishing, consisting essentially of an aqueous solution containing lignin sulfonate derived from the sulfonation of previously isolated lignin, and having from ½ to 1 sulfonic group per molecule of lignin, said solution having the property of forming a foam having fire extinguishing properties when mingled with gaseous $CO_2$, said solution being associated with a source of $CO_2$ which is unreleased until the moment of use.

2. A foam producing composition useful for fire extinguishing consisting essentially of an aqueous solution of an alkali metal carbonate and lignin sulfonate derived from previously isolated lignin and having from ½ to 1 sulfonic group per molecule of lignin, the ratio of alkali metal carbonate to lignin sulfonate being approximately 8 to 11 parts alkali metal carbonate to 2 to 6 parts lignin sulfonate by weight, said solution being associated with an acid component which is maintained unmingled therewith until the moment of use, when said acid component liberates gaseous $CO_2$ from said dissolved carbonate.

References Cited in the file of this patent
FOREIGN PATENTS
289,630    Great Britain _____ May 3, 1928